Patented Oct. 9, 1951

2,570,490

UNITED STATES PATENT OFFICE 2,570,490

WIRE COATING COMPOSITION

Harry L. Saums, Muskegon, Mich., assignor to Anaconda Wire and Cable Company, a corporation of Delaware No Drawing. Application February 15, 1949, Serial No. 76,670

2 Claims. (Cl. 106—187)

1

This invention relates to an improved wire coating composition for use in preparing an insulated wire of the same general type and for the same general uses as enameled copper magnet wire. The invention is particularly directed to the incorporation of silica of colloidal fineness in a wire coating composition of improved character that sets to a non-flowing form by gelation rather than by solvent evaporation and that is of improved character for wire coating purposes. This application is directed to a species of the invention that is described but not specifically claimed in my copending application Serial No. 76,669, filed February 15, 1949.

The copending application of Emil H. Olson, Serial No. 76,661, filed February 15, 1949, assigned to the same assignee as this application, describes an improved gelable wire coating composition that is composed essentially of an ester of cellulose with acetic, propionic or butyric acids, or a combination of such acids, dissolved in an improved solvent base composed essentially of 15% to 30% of a low-boiling aliphatic alcohol, 50% to 60% of a low-boiling aromatic hydrocarbon, and 10% to 30% of a low-boiling aliphatic ketone. I have discovered that this and other wire coating compositions are improved by the incorporation therein of colloidal silica, the colloidal silica being used in an amount in the range from 0.25% to 10% by weight of the cellulose ester or other solute component of the composition, and the maximum particle size of the silica being 50 millimicrons. The generic aspects and three species of wire coating compositions developed on the basis of this discovery are described in detail and are claimed in my above-mentioned co-pending application. This application is concerned with yet another species of the invention described in my said application, in which colloidal silica is incorporated in a gelable lacquer composition prepared in accordance with the aforementioned copending application of Emil H. Olson.

The coating composition described and claimed in the said Emil H. Olson application is composed essentially of an ester of cellulose with at least one aliphatic acid containing 2 to 4 carbon atoms dissolved in a composite solvent having the composition stated above, said ester constituting from 12% to 15% by weight of the composition. Such composition has a viscosity of 600 to 1500 centipoises at 100° F. and forms a non-flowing gel at about 65° F. In accordance with the present invention, this coating composition is improved by intimately dispersing silica of colloidal

2 fineness therein, the silica being used in the amount and having the maximum particle size stated above. The colloidal silica, especially when used in an amount less than 3% by weight of the cellulose ester, does not significantly increase the viscosity or flow characteristics of the composition at the temperature of application (preferably about 100° F.), but it greatly improves the character of the coating formed thereby.

A specific coating composition which has been found to be particularly advantageous, possessing a viscosity of about 900 centipoises at 100° F. and gelling to a nonflowing state at about 65° F., consists essentially of about 13% cellulose acetate butyrate (by weight of the composition) dissolved in a solvent consisting essentially of 20% to 25% by weight of ethyl alcohol, about 20% to 25% by weight of acetone, and the balance toluene. This composition is characterized in accordance with the invention by the fact that silica of colloidal fineness is intimately dispersed therein, the amount of such silica being from 1% to 3% by weight of the cellulose acetate butyrate, and the maximum particle size thereof being about 50 millimicrons.

As stated in my aforesaid copending application Serial No. 76,669, the silica employed in accordance with the invention is of true colloidal fineness. It is much finer than silica used for pigment or filler purposes, or the silica "flour" of commerce. The latter has a particle size approximating one micron, whereas the colloidal silica employed in accordance with the invention has a maximum particle size of 50 millimicrons and is for the most part of even smaller particle size ranging down about to one millimicron or perhaps even less. By "particle size" I mean in general the longest dimension of the individual silica particle; with particles that are of essentially spherical shape, "particle size" has reference to particle diameter.

The colloidal silica employed in accordance with the invention appears to be electrostatically charged, as indicated by the fact that its bulk density is between two and three pounds per cubic foot. Silica sand and even ordinary pigment or filler grade silica is much heavier in bulk, weighing approximately 100 pounds per cubic foot. It is my present belief that electrostatic charges on the colloidal particles are largely responsible for the improved properties brought about in wire coating compositions in which it is incorporated, but whether or not this is in fact the case still remains to be proved. I can only state at this time that the incorporation of colloidal silica in compositions of the character hereinbefore mentioned has the effect of greatly improving the adhesion of such compositions to wire to which they are applied. When wires are coated with ordinary gelable lacquer compositions composed of a cellulose ester dissolved in a solvent, the adhesion of the coating is so poor that upon stretching the wire to the breaking point the coating is pulled off in the form of a long tube. Substantially improved adhesion of the coating to the wire is obtained by using the particular composition of the aforesaid Emil H. Olson application, but I have found that the degree of adhesion of even this composition is enhanced by the inclusion of colloidal silica. Compositions prepared in accordance with this invention form coatings on fine-gauge, smooth-surfaced copper wire that adhere very tenaciously and that do not separate from the wire to any significant extent when it is stretched to the breaking point. Moreover, when a wire coated with the composition of the invention is wrapped closely about a mandrel three times its own diameter, no significant break can ordinarily be detected in the coating even with the aid of a magnifying lens; whereas similar treatment of a wire coated with a commercial gelable cellulose ester composition, not containing colloidal silica, results in frequent breaks in the coating that are easily discernible by the unaided eye.

The presence of colloidal silica in the coating composition of the present invention is also of advantage for its effect in improving the abrasion resistance, toughness, and tenacity of the coating formed thereby on the wire, and for improving somewhat the dielectric properties of the coating.

Colloidal silica cannot be dispersed in the liquid coating composition. When introduced into the liquid, the colloidal particles aggregate and produce a composition of lumpy consistency incapable of forming a thin, smooth, uniform coating on the wire. As described and claimed in my aforesaid copending application Serial No. 76,669, however, I have found that colloidal silica can be incorporated by grinding it together with the dry solid cellulose ester prior to dissolving the latter in the solvent.

It is possible and frequently desirable to incorporate conventional pigment and opaquing agents in the coating composition. If such substance is incorporated, it is best used in an amount from 3% to 10% by weight of the cellulose ester. Pigment grades of such compounds as titanium dioxide, magnesium silicate, ferric oxide, lead chromate and copper phthalocyanine derivatives have been used effectively for coloring or opaquing the coating produced by the composition. Such pigments should be very finely divided (having a particle size approximately one micron) to insure forming a smooth, uniform coating when the composition is applied to a wire. Pigments and opaquing agents are not to be confused with the colloidal silica employed in the composition in accordance with the invention, however. The white colloidal silica has but very slight opaquing properties, much less so than the pigments mentioned above, and is not employed for ordinary pigment purposes but rather to secure the improved adhesion of the coating to the wire and the other advantages described above.

If a pigment is employed, it is preferably incorporated in the composition by grinding it with the dry solid cellulose ester and the dry colloidal silica prior to dissolution of the ester in the solvent.

I claim:

1. A wire coating composition that sets by gelation composed essentially of a cellulose ester of with at least one aliphatic acid containing from 2 to 4 carbon atoms dissolved in a solvent composed essentially of 15% to 30% by weight of a lower monohydroxy alkanol, 50% to 60% by weight of one of a group made up of benzene and its methyl homologues, and 10% to 30% by weight of a lower alkyl ketone, said ester constituting 12% to 15% by weight of the composition and the composition having a viscosity of 600 to 1500 centipoises at 100° F. and forming, without substantial solvent evaporation, a non-flowing gel at 65° F., characterized in that silica of colloidal fineness is incorporated in the composition, the amount of said silica being from 0.25% to 10% by weight of the cellulose ester and the maximum particle size of the silica being 50 millimicrons.

2. A wire coating composition having a viscosity of about 900 centipoises at 100° F. that gels to a non-flowing state at about 65° F. consisting essentially of about 13% by weight of cellulose acetate butyrate dissolved in a solvent consisting essentially of 20% to 25% by weight of ethyl alcohol, about 20% to 25% by weight of acetone, and the balance toluene, characterized in that silica of colloidal fineness is intimately dispersed throughout the composition, the amount of silica being from 1% to 3% by weight of the cellulose acetate butyrate and the maximum particle size thereof being about 50 millimicrons.

HARRY L. SAUMS.

REFERENCES CITED

The following references are of record in the file of this patent:

UNITED STATES PATENTS

| Number | Name | Date |
| --- | --- | --- |
| 1,521,859 | Bohan | Jan. 6, 1925 |
| 1,818,108 | Theumann | Aug. 11, 1931 |
| 2,404,353 | Ash | July 23, 1946 |
| 2,417,344 | Barrett | Mar. 11, 1947 |
| 2,418,211 | Williams | Apr. 1, 1947 |

FOREIGN PATENTS

| Number | Country | Date |
| --- | --- | --- |
| 21,426 | Great Britain | of 1911 |

OTHER REFERENCES

"Mercose C," by Hercules Powder Co., page 6 (1941). (A copy in Div. 64.)

Certificate of Correction

Patent No. 2,570,490

October 9, 1951

HARRY L. SAUMS

It is hereby certified that error appears in the printed specification of the above numbered patent requiring correction as follows:

Column 3, line 59, for "approximately" read *approximating*; column 4, line 15, strike out "with";

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*